(12) United States Patent
Shiokawa (10) Patent No.: US 7,876,459 B2
(45) Date of Patent: Jan. 25, 2011

(54) PRINTING APPARATUS, PRINT PROCESSING SYSTEM AND PRINT PROCESSING METHOD FOR PROCESSING PRINT FILES HAVING DIFFERENT FILE FORMATS

(75) Inventor: Hideyuki Shiokawa, Utsunomiya (JP)

(73) Assignee: PANASONIC Corporation, Osaka (JP)

( * ) Notice: Subject to any disclaimer, the term of this patent is extended or adjusted under 35 U.S.C. 154(b) by 1022 days.

(21) Appl. No.: 11/276,650

(22) Filed: Mar. 9, 2006

(65) Prior Publication Data
US 2006/0221367 A1 Oct. 5, 2006

(30) Foreign Application Priority Data
Apr. 1, 2005 (JP) .............................. 2005/106196

(51) Int. Cl.
*G06F 3/12* (2006.01)
(52) U.S. Cl. ..................................... 358/1.13; 358/1.15
(58) Field of Classification Search ................ 358/1.13, 358/1.15
See application file for complete search history.

(56) References Cited
U.S. PATENT DOCUMENTS 6,166,826 A * 12/2000 Yokoyama ................. 358/1.16
7,064,858 B2 * 6/2006 Iwai et al. .................... 358/1.2
7,450,256 B2 * 11/2008 Simpson et al. ............ 358/1.15
2002/0087694 A1 * 7/2002 Daoud et al. ................ 709/226
2002/0097414 A1 * 7/2002 Utsunomiya ............... 358/1.13
2003/0002077 A1 * 1/2003 Shima ....................... 358/1.15
2003/0053118 A1 * 3/2003 Muramoto et al. ......... 358/1.15

FOREIGN PATENT DOCUMENTS
JP 2002-342050 11/2002

OTHER PUBLICATIONS
English language Abstract of JP 2002-342050.

* cited by examiner

*Primary Examiner*—Benny Q Tieu
*Assistant Examiner*—Qian Yang
(74) *Attorney, Agent, or Firm*—Greenblum & Bernstein, P.L.C.

(57) ABSTRACT

A print processing system includes a plurality of terminal apparatuses and a printing apparatus capable of communicating with the plurality of terminal apparatuses via a network, wherein, to process a print file having a format unprocessable on the printing apparatus, the printing apparatus appropriately specifies a terminal apparatus capable of processing the file format; instructs the terminal apparatus to print the file; and executes the print process using print job data transmitted from the terminal apparatus according to the print instruction.

17 Claims, 12 Drawing Sheets

| Priority | Device name | IP address | Standard application | Alternative application | Load status |
|---|---|---|---|---|---|
| 1 | PC (1) | xxx.xxx.xxx.xxx | B | A',B' | 5 |
| 2 | PC (2) | xxx.xxx.xxx.xxx | B | A',B',C' | 15 |
| 3 | PC (3) | xxx.xxx.xxx.xxx | A,B | A',B',C' | 8 |
| — | — | — | — | — | — |
| — | — | — | — | — | — |
| — | — | — | — | — | — |

Fig.5

X units of apparatuses are registered.
Set priority.

| Priority | Device name | IP address |
|----------|-------------|-----------------|
| 1 | PC1 | xxx.xxx.xxx.xxx |
| 2 | PC2 | xxx.xxx.xxx.xxx |
| 3 | PC3 | xxx.xxx.xxx.xxx |
| ⋮ | ⋮ | ⋮ |

```
              Viewer
        Select file to display

File          Size
    1     test1.doc     20Kbyte
    2     test2.doc     120Kbyte
    3     test3.doc     220Kbyte
                 ⋮
```

Fig.12(B)

PRINTING APPARATUS, PRINT PROCESSING SYSTEM AND PRINT PROCESSING METHOD FOR PROCESSING PRINT FILES HAVING DIFFERENT FILE FORMATS

BACKGROUND OF THE INVENTION

1. Field of the Invention

The present invention relates to a printing apparatus capable of communicating with predetermined terminal apparatuses via network, a print processing system including the printing apparatus and a print processing method.

2. Description of Related Art

Conventional printing apparatuses having a print function (e.g., a copy apparatus, a facsimile apparatus, a multifunction apparatus having copy and facsimile functions and the like) are capable not only of executing print jobs received from terminal apparatuses (e.g., PCs) connected via a network such as a LAN (Local Area Network) and the like, but also of executing print operations when predetermined files are specified on the printing apparatuses.

Executing the print operations on the printing apparatuses requires generation of predetermined print files processable on the printing apparatuses, from files having various formats created using different applications. Generally, however, file formats processable on the printing apparatuses are limited. For files having formats unprocessable on the printing apparatuses, technologies are available that allow the printing apparatuses to execute the print operations using application programs installed on the terminal apparatuses connected via the network.

For example, when a file stored in an external apparatus (e.g., a PC) connected via network is specified for printing and a format of the specified file is unprocessable on a printing apparatus, a technology is known to have an application program installed on the external apparatus convert the file into a file printable on the printing apparatus (Related Art 1).

[Related Art 1] Japanese Patent Laid-open Publication 2002-342050

With the technology disclosed in Related Art 1 above, when the external apparatus that stores the file has no application program capable of converting the file into the printable format, the printing apparatus searches for another external apparatus having an application program capable of converting the file.

It takes time and it is inefficient, however, to search through a plurality of external apparatuses connected to the network since availability of the application program for file conversion needs to be checked individually. Further, when an external apparatus that executes file conversion is in use by another user or has a low processing capability, the external apparatus is overloaded and its processing speed is significantly deteriorated.

SUMMARY OF THE INVENTION

The present invention is provided to address the above-described problems. A main purpose of the present invention is to provide a printing apparatus capable of performing an easy and quick print process regardless of print file formats, a print processing system that includes the printing apparatus and a print processing method.

The present invention relates to a print processing system that includes a plurality of terminal apparatuses and a printing apparatus capable of communicating with the plurality of terminal apparatuses via a network. Each of the plurality of the terminal apparatuses has an information transmitter that transmits, to the printing apparatus, file format information on processable file formats; and a print controller that transmits, to the printing apparatus, print job data according to a print instruction from the printing apparatus. The printing apparatus has an information obtaining unit that obtains the file format information transmitted from the information transmitter; a memory that stores the file format information obtained by the information obtaining unit; a file determining unit that determines whether or not the printing apparatus is able to process a print file format; an apparatus specifying unit that specifies, from the plurality of the terminal apparatuses, one terminal apparatus capable of processing the print file based on the file format information stored in the memory, when the print file format is determined unprocessable on the printing apparatus; a print instruction unit that instructs the terminal apparatus specified by the apparatus specifying unit to print the print file; and a receiver that receives the print job data from the terminal apparatus. The printing apparatus prints the unprocessable print file using the print job data, which is transmitted from the terminal apparatus in response to the print instruction from the printing apparatus.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein.

DETAILED DESCRIPTION OF PREFERRED EMBODIMENTS

The embodiments of the present invention are explained in the following, in reference to the above-described drawings.

First Embodiment

Figure 1:
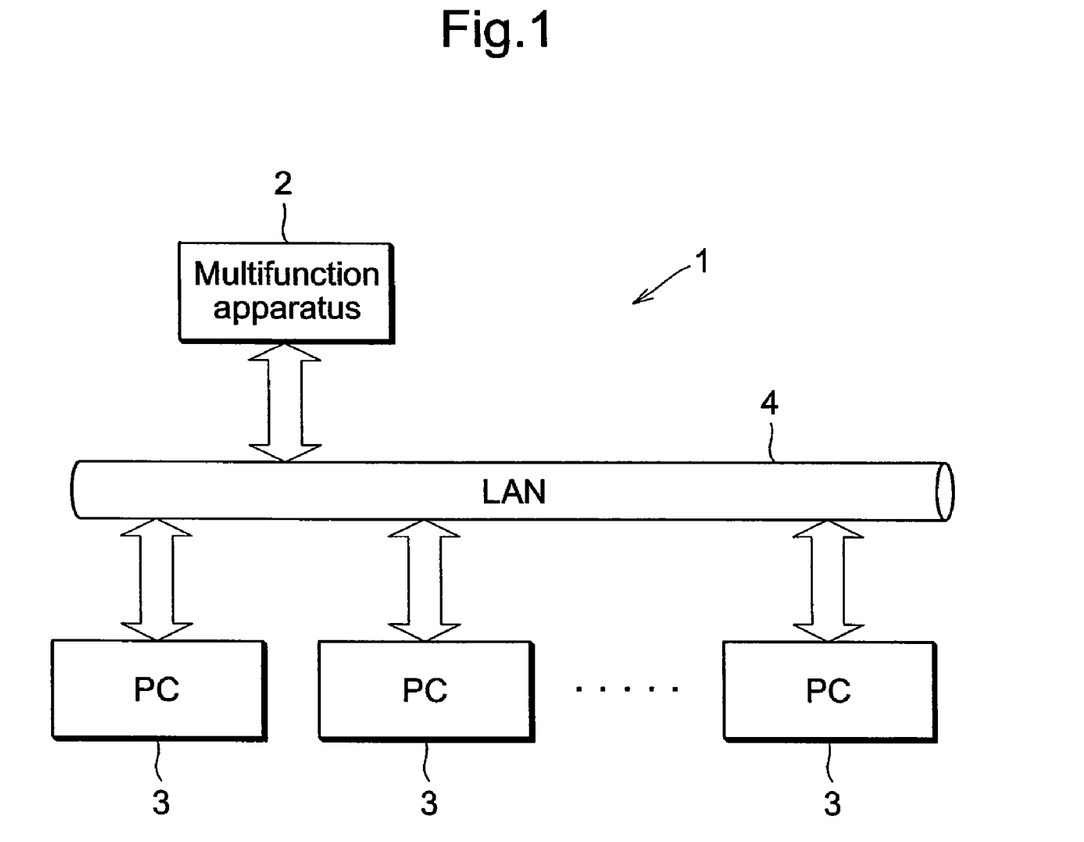
FIG. 1 is a block diagram illustrating a general configuration of a print processing system according to a first embodiment of the present invention.

FIG. 1 is a block diagram illustrating a general configuration of a print processing system according to a first embodiment of the present invention. Print processing system 1 includes multifunction apparatus 2, as a printing apparatus, connected via a LAN (Local Area Network) 4 to communicate with a plurality of PCs (Personal Computer) 3, as a terminal apparatus. In print processing system 1, PCs 3 are able to transmit print job data to multifunction apparatus 2 according to a print instruction from the multifunction apparatus; multifunction apparatus 2 is able to receive the print job data transmitted from PCs 3 and execute the print jobs. Operations of PCs 3 and multifunction apparatus 2 will be described later.

The printing apparatus in the present invention is not limited to a multifunction apparatus, but may be a copy apparatus, a facsimile apparatus and the like having a similar print function. Further, the terminal apparatus in the present invention is not limited to a PC, but may be a network apparatus having a similar information processing function. In addition, multifunction apparatus 2 and PCs 3 are not necessarily connected via a LAN, but may be connected via a wide area network or the like.

Figure 2:
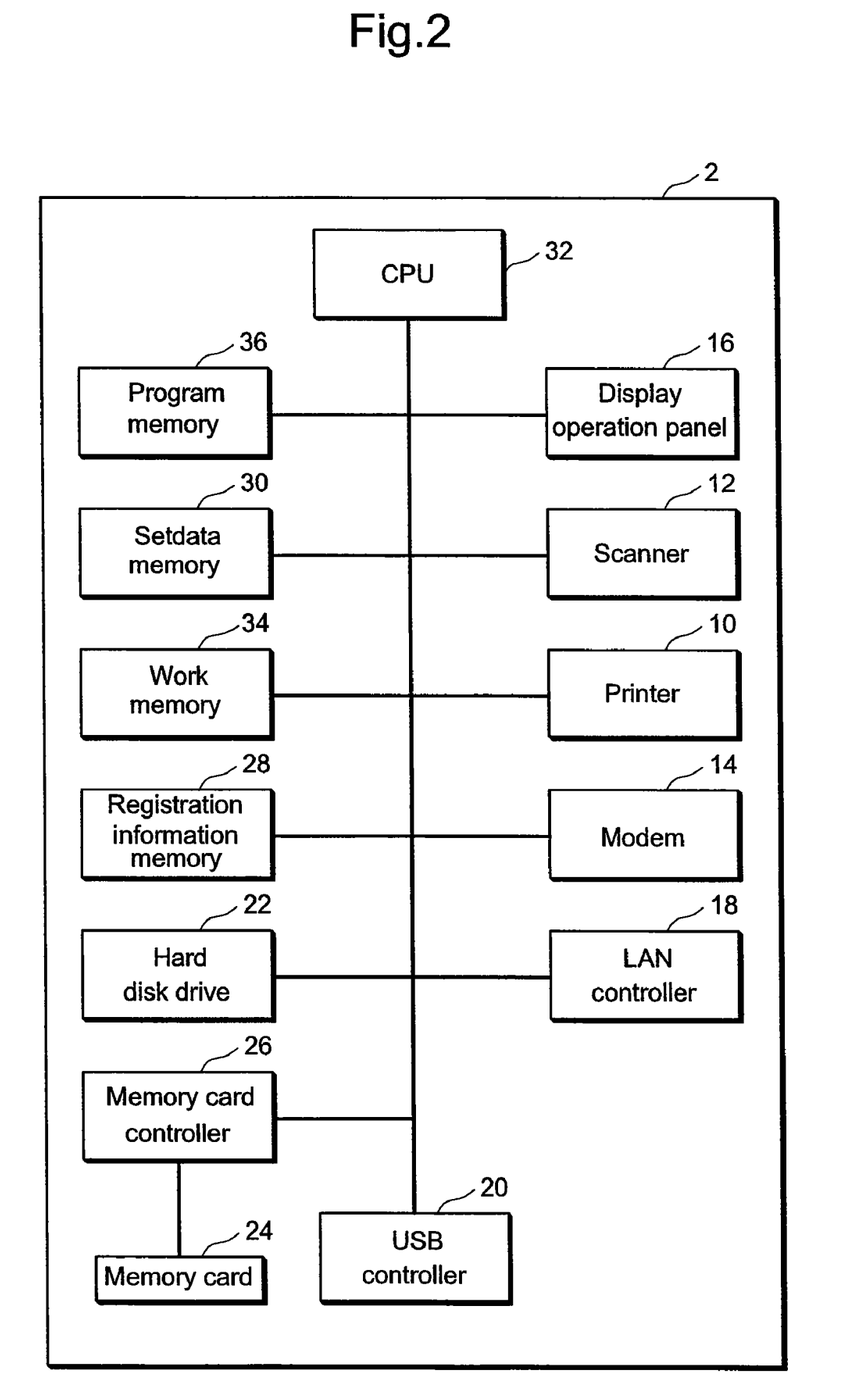
FIG. 2 is a block diagram illustrating a general configuration of a multifunction apparatus in the print processing system in FIG. 1.

FIG. 2 is a block diagram illustrating a general configuration of the multifunction apparatus in the print processing system shown in FIG. 1. Multifunction apparatus 2 mainly includes: printer 10 that prints onto a recording paper using an electronic photography method; scanner 12 that scans an image on a draft and generates image data; modem 14 that converts digital signals into analog signals and vice versa and communicates with another device via a public switched telephone network, which is not shown in the figure; display operation panel (input/setting unit) 16 that includes input keys for instructing and setting operations for functions of multifunction apparatus 2 and that includes a display indicating various information; LAN controller 18 that controls network connection to LAN 4 and transmits/receives e-mails and data; USB (Universal Serial Bus) controller 20 that controls communication with another device connected via USB; hard disk drive 22 that stores various types of data, including image data for print process, scanning process and the like; memory card controller (connector) 26 that controls connection of memory card 24 to multifunction apparatus 2; registration information memory (memory) 28, containing non-volatile memory (e.g., flash ROM), that stores information on control programs, function settings and the like; set data memory 30, containing non-volatile memory, that stores various types of data set by a user; CPU 32 that performs overall control on operations of the sections described above; work memory 34, containing volatile memory (e.g., DRAM), that provides CPU 32 with a work area for control; and program memory 36, containing non-volatile memory, that stores control programs for CPU 32 to execute various controls.

Memory card 24 needs not to be connected to multifunction apparatus 2 all the time. Normally, a user who uses multifunction apparatus 2 stores text or image files for printing in the memory card and carries the memory card with the user. When printing a file stored in memory card 24, the user inserts memory card 24 into a card slot, which is not shown in the figure, to connect to multifunction apparatus 2.

Figure 3:
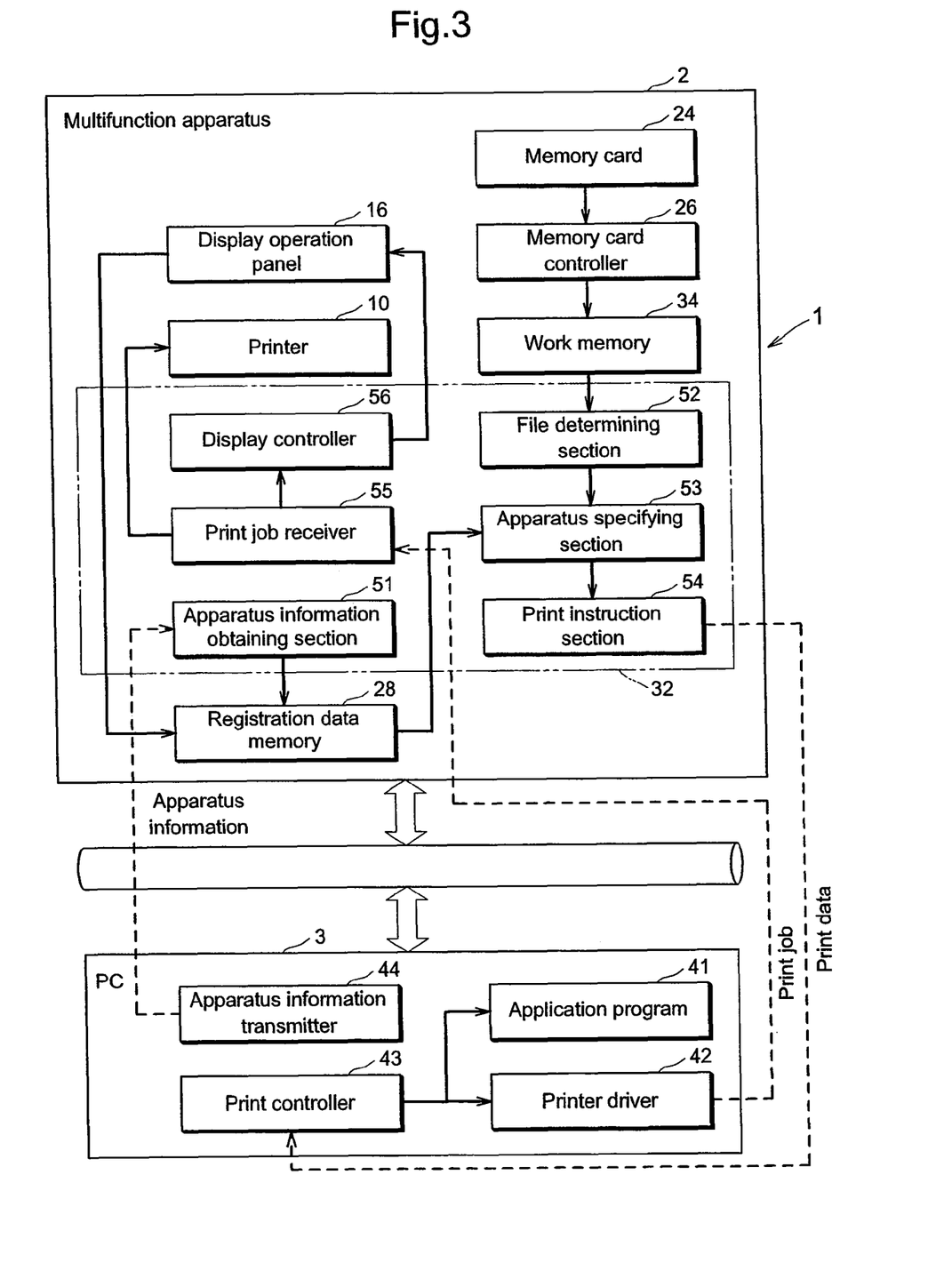
FIG. 3 is a functional block diagram illustrating the multifunction apparatus and a PC in the print processing system in FIG. 1.

FIG. 3 is a functional block diagram illustrating the multifunction apparatus and the PC in the print processing system shown in FIG. 1. The figure shows a case when a user specifies a file stored in memory card 24 as a print file and prints the file.

Each of the plurality of PCs 3 includes application programs 41 that execute processes for word processing, a spreadsheet, a database and the like and printer driver 42 that controls print operations for transmitting print job data to multifunction apparatus 2. The application programs and the printer driver are stored in an external storage apparatus, which is not shown in the figure. Further, PC 3 has print controller (print controller) 43 that, responding to a print instruction from multifunction apparatus 2, opens a print file and executes print operations using application programs 41 and that transmits to apparatus information transmitter (information transmitter) 44 print job data using printer driver 42; and apparatus information transmitter 44 that transmits to multifunction apparatus 2 apparatus information, including file format information related to file formats that application programs 41 support and processing load information of PC 3. The functions described above are performed by the CPU of PC 3, which is not shown in the figure, that executes processes based on predetermined control programs stored in a predetermined non-volatile memory.

Multifunction apparatus 2 includes apparatus information obtaining section (information obtaining unit) 51 that obtains the apparatus information transmitted from apparatus information transmitter 44 of each of the plurality of PCs 3; file determining section (file determining unit) 52 that determines whether or not the multifunction apparatus is able to process a print file format; apparatus specifying section (apparatus specifying unit) 53 that specifies one PC 3 capable of processing the print file, based on the apparatus information stored in registration information memory 28, when the print file format is determined unprocessable on the multifunction apparatus; print instruction section (print instruction unit) 54 that instructs PC 3 specified by apparatus specifying section 53 to print the print file; print job receiver (receiver) 55 that receives the print job data transmitted from print controller 43 of PC 3; and display controller (display controller) 56 that executes print preview of the print file based on the received print job data. The functions described above are performed by CPU 32 that executes processes based on predetermined control programs stored in program memory 36.

Figure 4:
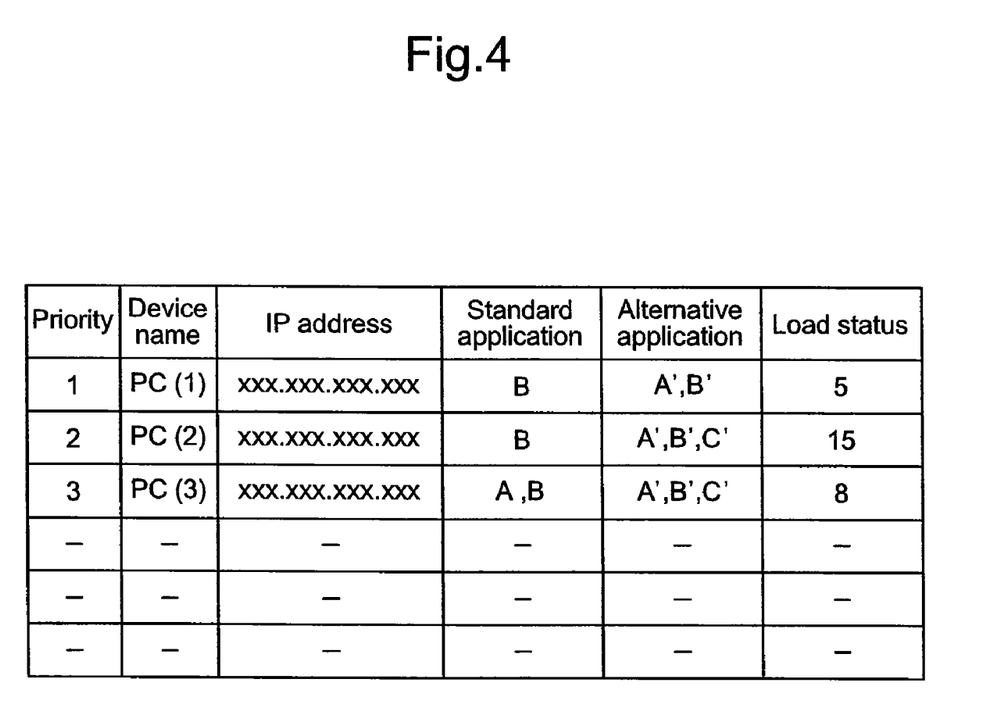
FIG. 4 illustrates a configuration example of an apparatus information table.

In print processing system 1 having the configuration above, the apparatus information transmitted from apparatus information transmitter 44 of each of the plurality of PCs 3 is stored in registration information memory 28 in a form of an apparatus information table. As FIG. 4 shows, the apparatus information table contains the following items: a PC 3 name (a device name), an IP address of PC 3, standard application programs (standard applications) installed on PC 3, alternative application programs (alternative applications) installed on PC 3, a processing load (a load status) of PC 3 and the like. Priority (an order of PC (1), PC (2) and PC (3) in this table) is set for the apparatus information of the PCs.

In this application, a "standard application program" (hereinafter referred to as a "standard application") means, in relation to a file having a predetermined file format, a standard program that supports the predetermined file format; i.e., a program capable of creating a new file having the predetermined file format and of opening a file created in the predetermined file format for editing and printing the file. Meanwhile, an "alternative application program" (hereinafter referred to as an "alternative program") means a program capable of alternatively executing at least a part of process that the standard program supporting the predetermined file format performs. In particular, the alternative program is a program capable at least of opening a file created in the predetermined format and of printing at least a part of the contents (e.g., images and texts) of the file. Examples of the alternative program include a text editor that opens a text file created using predetermined word processing software, which is provided as the standard application program, and prints the text file in a text format; and image editing software or the like that opens and prints an image file created using predetermined photo retouching software, which is provided as the standard application program. A standard application for one file format may be an alternative application for another file format.

Indications "A'," "B'" and "C'" in the alternative application column of the apparatus information table indicate alternative applications capable of handling file formats that standard applications "A," "B" and "C" support respectively.

A numeric value in the load status column of the apparatus information table shows a total of a quantified CPU processing capability of PC 3 in 10 levels (the processing capability ranges from 1 to 10) and a quantified remaining main memory capacity of PC 3 in 10 levels (the remaining memory capacity ranges from 1 to 10). A PC (2) load status of "15," for example, is gained by adding a CPU processing capability of "7" when PC (2) transmits the apparatus information and a remaining main memory capacity of "8."

The load status of PC 3 fluctuates in short intervals compared with application programs installed on PC 3. Apparatus information transmitter 44 is therefore able to transmit to multifunction apparatus 2 the processing load information alone in relatively short intervals, separating from transmission of the application program information.

Figure 5:
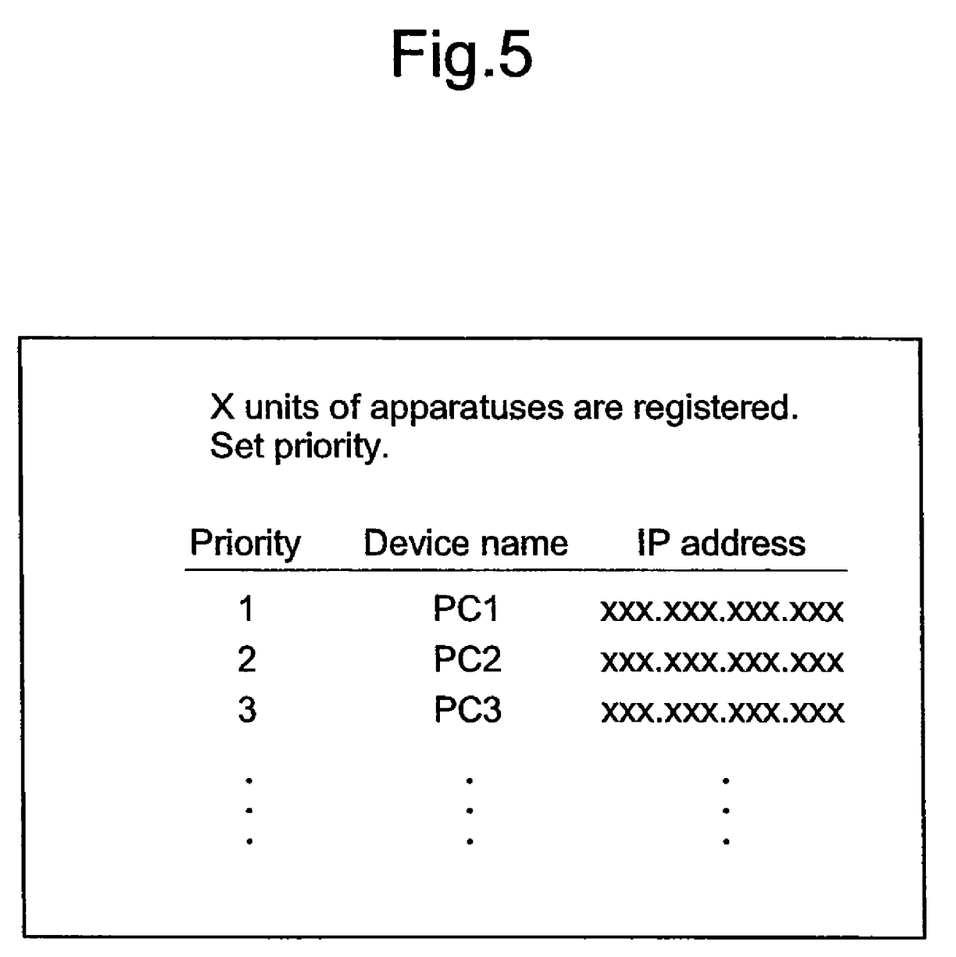
FIG. 5 illustrates a screen example for setting priority in the apparatus information table in FIG. 4.

A user can set the PC priority in the apparatus information table of FIG. 4 by input operations on display operation panel 16 of multifunction apparatus 2. As shown in FIG. 5, display operation panel 16 displays on the display part of the information ("priority," "device name," and "IP address" in this figure) of the apparatus information table and allows the user to operate predetermined input keys to change priority settings. Based on the set priority, apparatus specifying section 53 is able to re-specify another PC when print instruction section 54 fails in print instruction to PC 3, which will be described later.

Figure 6:
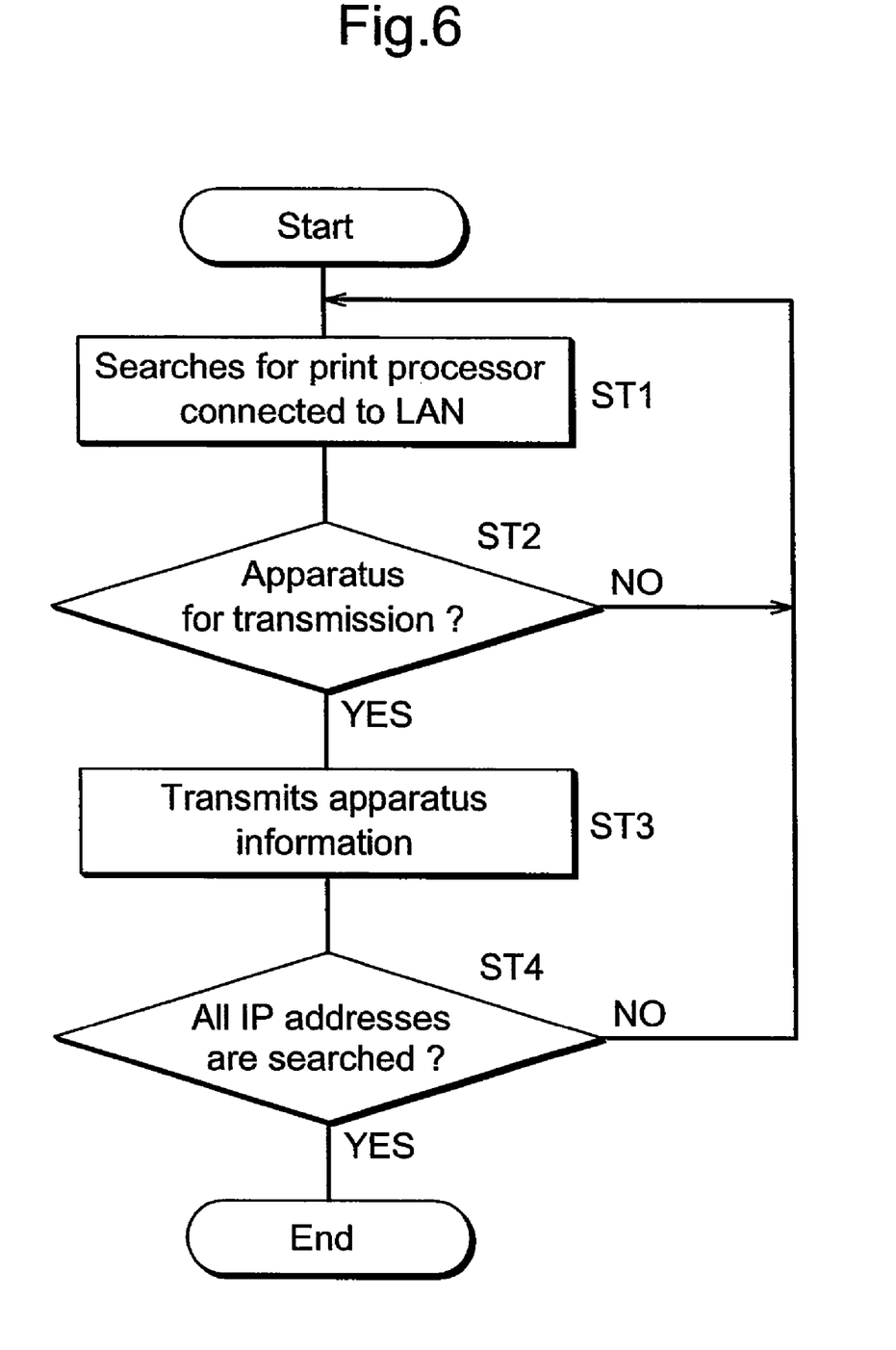
FIG. 6 is a flowchart illustrating operations for transmitting apparatus information from the PC to the multifunction apparatus executed in the print processing system shown in FIGS. 1, 2 and 3.

FIG. 6 is a flowchart illustrating operations for transmitting the apparatus information from the PC to the multifunction apparatus executed in the print processing system shown in FIGS. 1, 2 and 3.

Apparatus information transmitter 44 of PC 3 first searches network devices on a subnet connected to LAN 4 based on IP addresses in order to identify a printing apparatus for transmission (ST1). When the printing apparatus identified in the step (multifunction apparatus 2 in this description) is an apparatus for transmission (i.e., multifunction apparatus 2 has a function for transmission, ST2: Yes), PC 3 then transmits its apparatus information to multifunction apparatus 2 (ST3). The transmitted apparatus information is received by apparatus information obtaining section 51 and stored in registration information memory 28 of multifunction apparatus 2 for transmission. Finally, when completing search of all IP addresses on the subnet (ST4: Yes), PC 3 ends the operations for transmitting the apparatus information.

Figure 7:
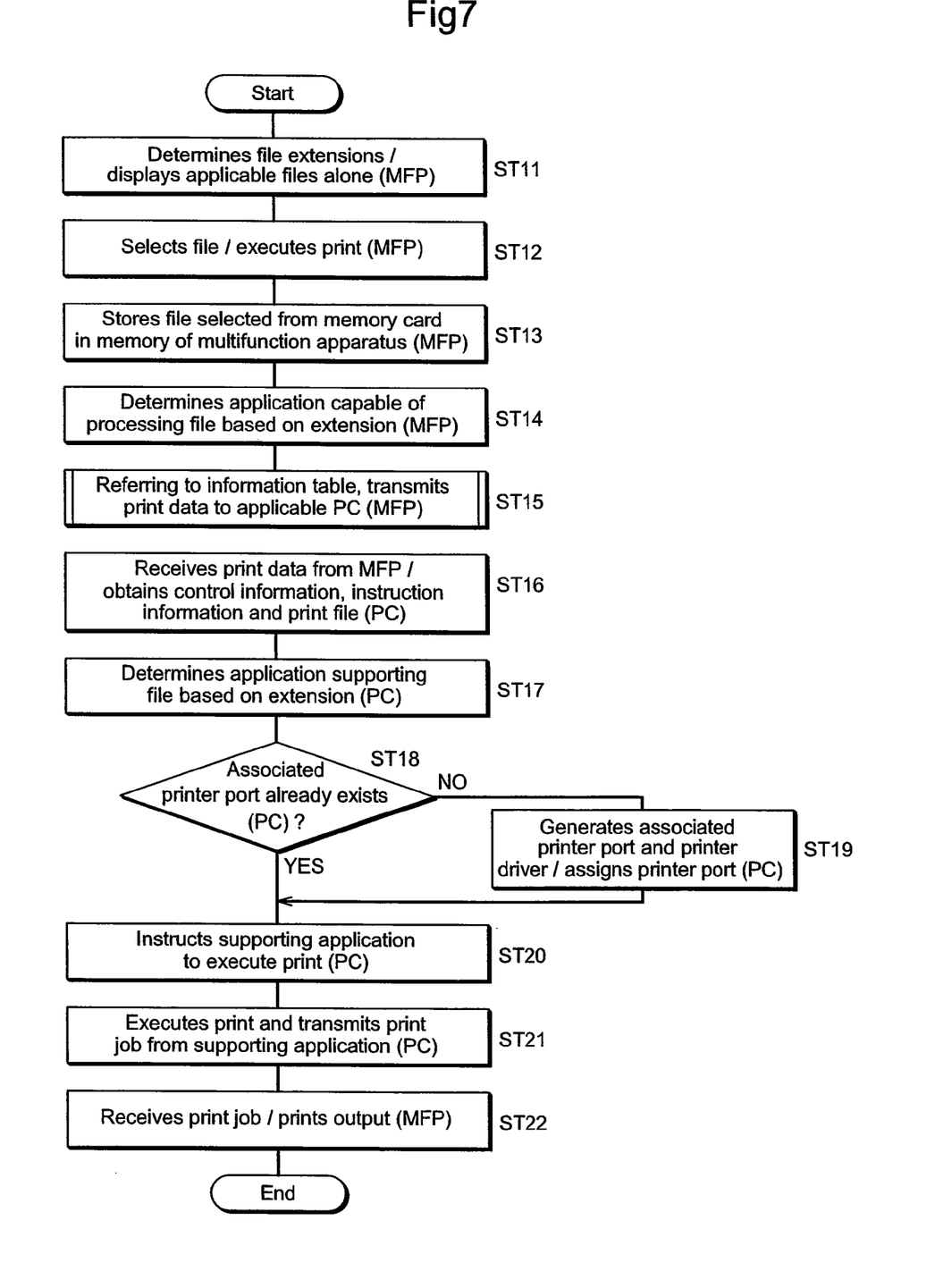
FIG. 7 is a flowchart illustrating print processing operations executed in the print processing system shown in FIGS. 1, 2 and 3.

FIG. 7 is a flowchart illustrating print processing operations executed in the print processing system shown in FIGS. 1, 2 and 3. The description below shows a case of printing a print file unprocessable on multifunction apparatus 2 by using print job data transmitted from PC 3 according to a print instruction from multifunction apparatus 2.

Multifunction apparatus (MFP) 2 first determines extensions of files stored in memory card 24 and displays only files possibly used for printing on display operation panel 16 (ST11). Then, a user selects a print file from the displayed files and gives a print instruction (ST12). In response to the print instruction, the print file selected by the user is transferred to and stored in work memory 34 in multifunction apparatus 2 (ST13). File determining section 32 then determines an application program ("B" in this case) that supports the file, based on an extension of the print file (file format) stored in work memory 34 (ST14). Although not shown in the figure, when multifunction apparatus 2 supports the file having the extension, printer 10 prints output, issuing no print instruction to PC 3.

Since multifunction apparatus 2 is unable to process the print file in this case, apparatus specifying section 53 refers to the apparatus information table shown in FIG. 4 and specifies a terminal apparatus having application program "B" and a highest priority, that is, PC (1). Print instruction section 54 then transmits print data and issues the print instruction to specified PC (1) (ST15). The print data contains control information, including information to control print on PC (1); instruction information, including print settings and the like; and data of the print file. When receiving the print data, print controller 43 of PC (1) generates the print file (ST16) and determines an application program ("B" in this case) that supports the file based on the print file extension (ST17).

On PC (1), print controller 43 then determines whether or not a printer port for multifunction apparatus 2 already exists (ST18). When no printer port for multifunction apparatus 2 exists, print controller 43 generates a printer port for multifunction apparatus 2, further generates a printer driver for multifunction apparatus 2 and assigns the printer port to the printer driver (ST19). Print controller 43 then starts application program 41 that supports the print file for printing the print file and instructs printer driver 42 to transmit print job data to multifunction apparatus 2 (ST20). Responding to the instruction, application program 41 opens the print file and executes print process; printer driver 42 transmits to multifunction apparatus 2 the print job data of the print file (ST21). Print job receiver 55 of multifunction apparatus 2 receives the transmitted print job data, printer 10 prints output (ST22) and then the print process operations are complete.

Figure 8:
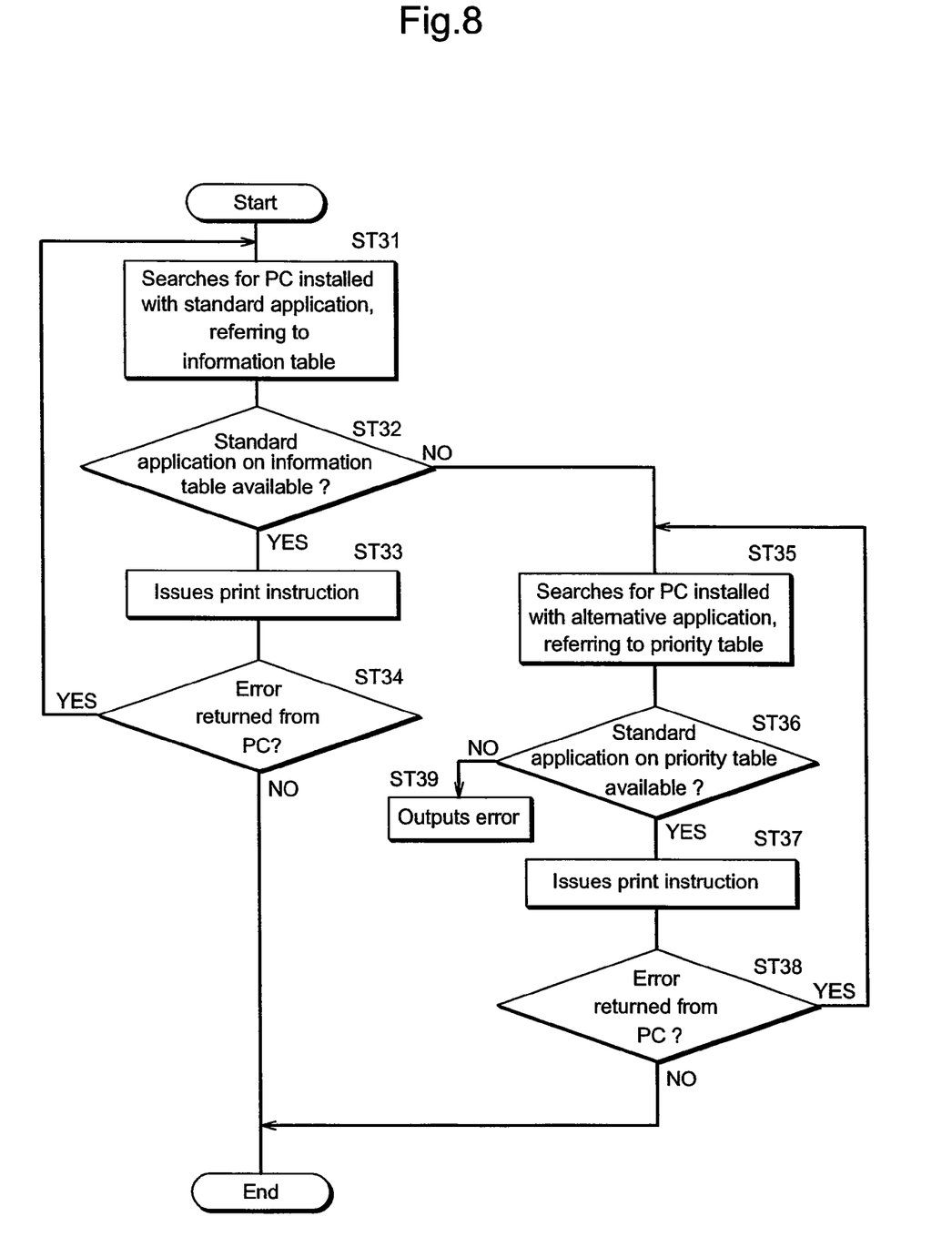
FIG. 8 is a flowchart illustrating a first modification example of operations for specifying a PC and issuing a print instruction in the operations shown in FIG. 7.

FIG. 8 is a flowchart illustrating a first modification example of operations for specifying a PC capable of processing the print file and issuing a print instruction in the operations shown in FIG. 7. The example shows applicable operations that replace step ST15 in FIG. 7, where apparatus specifying section 53 specifies PC 3 installed with an alternative application that supports the print file format when no PC 3 exists installed with a standard application supporting the print file format.

Based on the priority in the apparatus information table of FIG. 4, apparatus specifying section 53 first searches for a PC installed with the standard application that supports the file format determined by file determining section 32 (ST31). When the PC exists installed with the standard application in the apparatus information table and the PC is specified (ST32: Yes), print instruction section 54 transmits print data and issues the print instruction to the specified PC (ST33). When the PC receiving the print instruction operates normally and returns no error information (ST34: No), the operations are complete for specifying the PC and issuing the print instruction. When the PC receiving the print instruction does not operate normally and returns error information (ST34: Yes), on the other hand, the operations return to ST31 and repeat as described above.

When no PC exists installed with the standard application in the apparatus information table in step ST32, apparatus specifying section 53 searches for a PC installed with an alternative application that supports the file format determined by file determining section 32, based on the priority in the apparatus information table of FIG. 4 (ST35). When the PC exists installed with the alternative application in the apparatus information table and the PC is specified (ST36: Yes), print instruction section 54 transmits the print data and issues the print instruction to the specified PC (ST37). When the PC receiving the print instruction operates normally and returns no error information (ST38: No), the operations are complete for specifying the PC and issuing the print instruction. When the PC receiving the print instruction does not operate normally and returns error information (ST38: Yes), on the other hand, the operations return to ST35 and repeat as described above. When no PC exists installed with any of the alternative applications in the apparatus information table (ST36: No), printer 10 outputs information that an error occurred.

When the print file format is processable using standard application "C" in the operations above, for example, apparatus specifying section 53 searches for a PC installed with standard application "C" based on the priority in the apparatus information table of FIG. 4. Since none of PCs (1), (2) and (3) in this case is installed with standard application "C," apparatus specifying section 53 searches for a PC installed with alternative application "C'" based on the priority in the apparatus information table of FIG. 4. PCs (2) and (3) in this case are installed with alternative application "C'," and PC (2) is specified since PC (2) has a higher priority. Print instruction section 54 then transmits the print data and issues the print instruction to PC (2).

Figure 9:
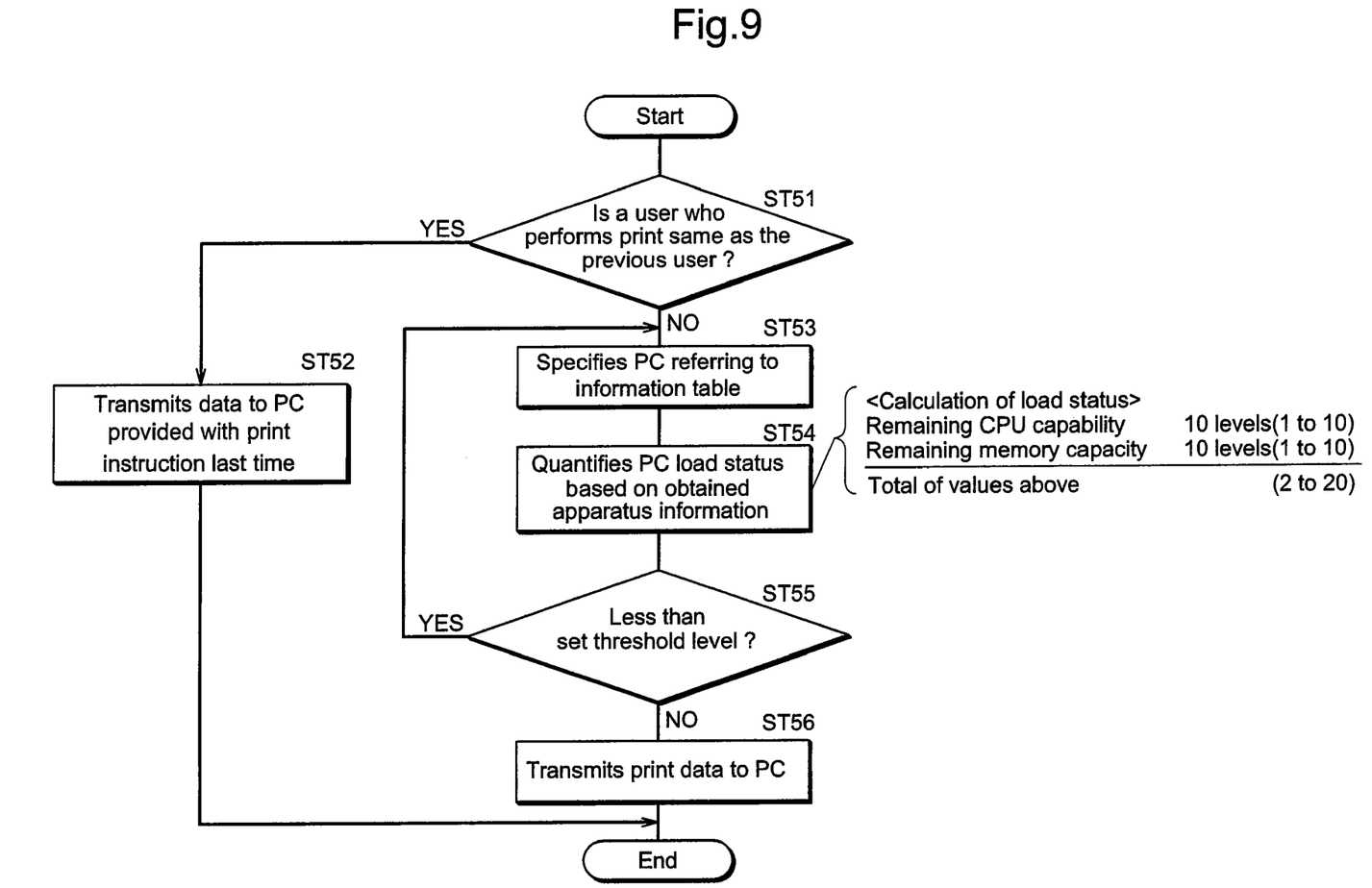
FIG. 9 is a flowchart illustrating a second modification example of operations for specifying a PC and issuing a print instruction in the operations shown in FIG. 7.

FIG. 9 is a flowchart illustrating a second modification example of operations for specifying a PC capable of processing the print file and issuing a print instruction in the operations shown in FIG. 7. The example shows applicable operations that replace step ST15 in FIG. 7, where apparatus specifying section 53 specifies a PC referring to the load status in the apparatus information table of FIG. 4.

Multifunction apparatus 2 first determines whether a user who performs a print action is identical to a user who performed a print action last time (ST51) by, for example, confirming log-in names required to use multifunction apparatus 2. When confirming that the user is identical to the previous user, print instruction section 54 transmits the print data to a PC specified by apparatus specifying section 53 in the previous print process (ST52) and completes the operations for specifying the PC and issuing the print instruction.

When the user is not identical to the previous user (ST51: No), on the other hand, apparatus specifying section 53 selects a PC installed with the standard application that supports the file format determined by file determining section 32, based on the priority in the apparatus information table of FIG. 4 (ST53); and quantifies a processing load as the "load status," based on the CPU processing capability and the remaining main memory capacity of the selected PC (ST54). When the load status level is below a predetermined threshold level (i.e., the selected PC's load is high, ST55: Yes), the operations return to step ST53 and apparatus specifying section 53 selects a PC of a next highest priority. When the load status level is above the predetermined threshold level (i.e., the selected PC's load is low), print instruction section 54 transmits the print data to the selected PC and completes the operation for specifying the PC and issuing the print instruction.

When the user that performs the print action is not identical to the previous user and the print file format is processable using standard application "B" in the operations above, for example, apparatus specifying section 53 searches for a PC installed with standard application "B" based on the priority in the apparatus information table of FIG. 4. All PCs (1), (2) and (3) in this case are installed with standard application "B," and PC (1) is specified since PC (1) has a highest priority. Since a PC (1) load status level of "5" is below the predetermined threshold level ("10" in this case), however, PC (2) of a next highest priority is specified. A PC (2) load status level of "15" is above the predetermined threshold level, thus print instruction section 54 transmits the print data and issues the print instruction to specified PC (2).

The operations in FIGS. 8 and 9 described above are not necessarily exclusive operations. For instance, when the user who performs the print action is not identical to the previous user and the print file format is processable using standard application "A," apparatus specifying section 53 searches for a PC installed with standard application "A" based on the priority in the apparatus information table of FIG. 4 and, in this case, specifies PC (3) installed with standard application "A." Since a PC (3) load status level of "8" is below the predetermined threshold level ("10" in this case), apparatus specifying section 53 searches again for a PC installed with standard application "A." However, no other PCs exist installed with standard application "A." Then, apparatus specifying section 53 searches for a PC installed with alternative application "A'" based on the priority in the apparatus information table of FIG. 4. PC (1) is installed with alternative application "A'," but a PC (1) load status level of "5" is below the predetermined threshold level; therefore, PC (2) of a next highest priority is specified. Since a PC (2) load status level of "15" is above the predetermined threshold level, print instruction section 54 transmits the print data and issues the print instruction to specified PC (2).

Second Embodiment

Figure 10:
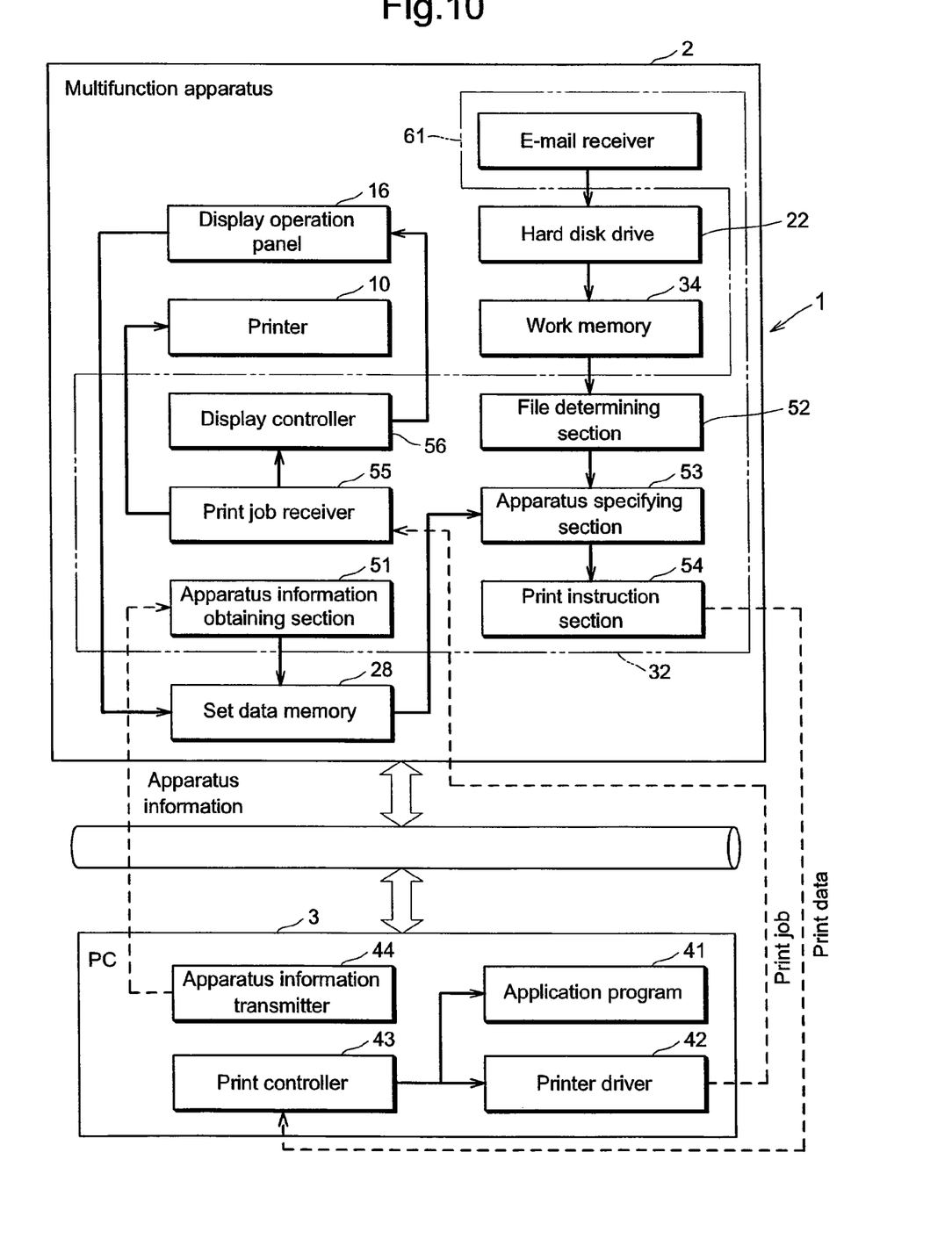
FIG. 10 is a functional block diagram of a multifunction apparatus and a PC according to a second embodiment of the present invention.

FIG. 10 is a functional block diagram of a multifunction apparatus and a PC according to a second embodiment of the present invention. The figure shows a case when a user specifies a file attached to an e-mail received by multifunction apparatus 2 as a print file and prints the file.

The second embodiment is different from the first embodiment shown in FIG. 3 in a point that the user specifies the file attached to the e-mail, which is received by e-mail receiver 61 and stored in hard disk drive 22 of multifunction apparatus 2, as the print file and prints the file. However, configurations of a print processing system and the multifunction apparatus are the same as the configurations shown in FIGS. 1 and 2. Further, other items are the same as those in the first embodiment, unless otherwise specifically stated.

Figure 11:
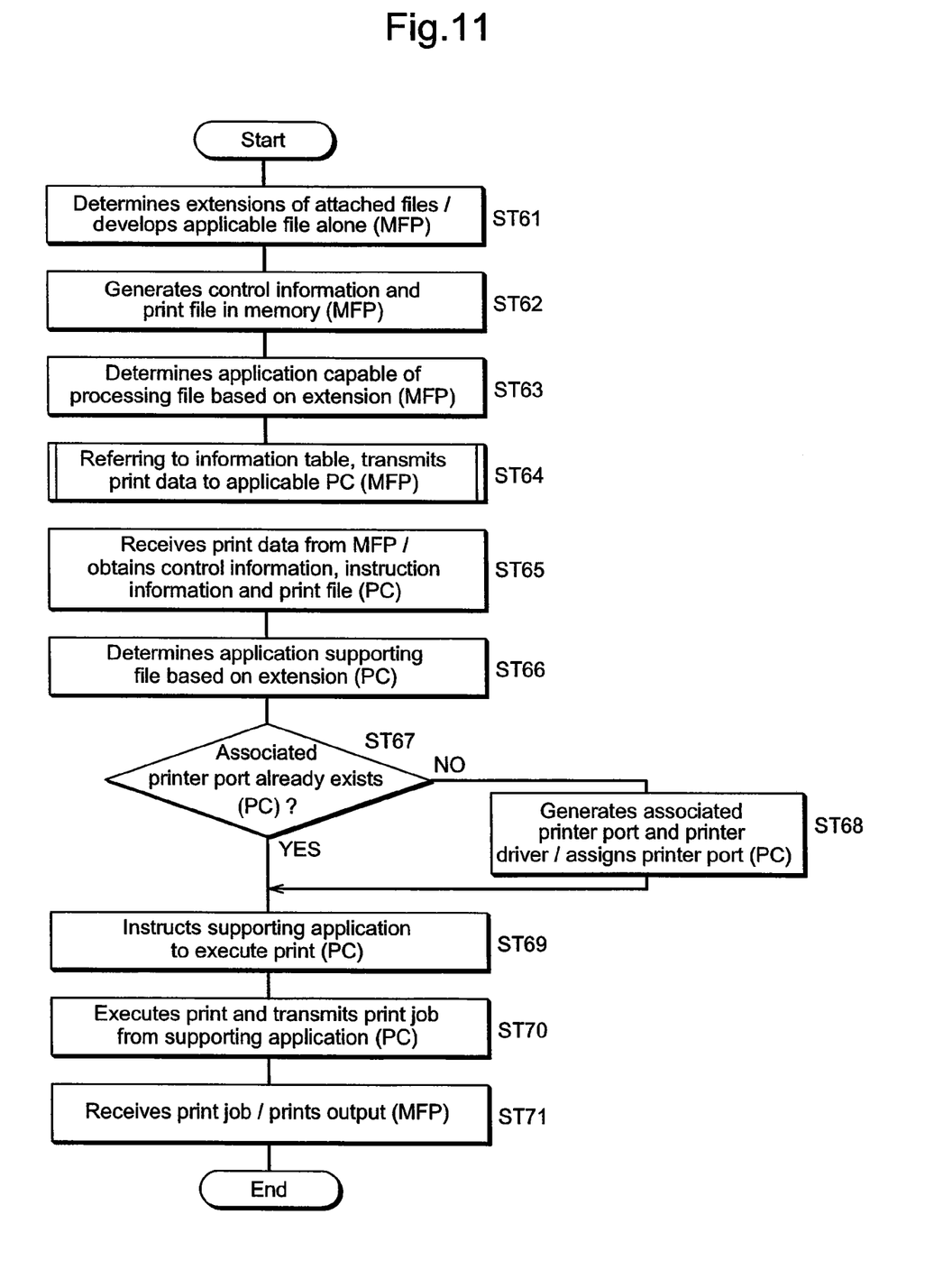
FIG. 11 is a flowchart illustrating print processing operations executed in the print processing systems shown in FIGS. 1 and 10.

FIG. 11 is a flowchart illustrating print processing operations executed in the print processing systems shown in FIGS. 1 and 10. The description below shows a case of printing a print file unprocessable on multifunction apparatus 2 by using print job data transmitted from PC 3 according to a print instruction from multifunction apparatus 2.

When instructed to print the file attached to the e-mail by the user, multifunction apparatus (MFP) 2 first determines extensions of files attached to e-mails stored in hard disk drive 22; develops only an attachment file possibly used for printing in work memory 34 (ST61); and generates control information and a print file (ST62). Then, file determining section 32 determines an application program ("B" in this case) that supports the file based on the extension of the print file (file format) stored in work memory 34 (ST63). Although not shown in the figure, when multifunction apparatus 2 supports the file having the extension, printer 10 prints output, issuing no print instruction to PC 3.

Since multifunction apparatus 2 is unable to process the print file in this case, apparatus specifying section 53 refers to the apparatus information table shown in FIG. 4 and specifies a terminal apparatus having application program "B" and a highest priority, that is, PC (1). Then, print instruction section 54 transmits print data and issues a print instruction to specified PC (1) (ST64). The print data contains control information, including information to control print on PC (1); instruction information, including print settings and the like; and data of the print file. When receiving the print data, print controller 43 of PC (1) generates the print file (ST65) and determines an application program ("B" in this case) that supports the file based on the print file extension (ST66).

On PC (1), print controller 43 then determines whether or not a printer port for multifunction apparatus 2 already exists (ST67). When no printer port for multifunction apparatus 2 exists, print controller 43 generates a printer port for multifunction apparatus 2, further generates a printer driver for multifunction apparatus 2 and assigns the printer port to the printer driver (ST68). Print controller 43 then starts application program 41 that supports the print file for printing the print file and instructs printer driver 42 to transmit print job data to multifunction apparatus 2 (ST69). Responding to the instruction, application program 41 opens the print file and executes print process, and printer drive 42 transmits to multifunction apparatus 2 the print job data of the print file (ST70). Print job receiver 55 of multifunction apparatus 2 receives the transmitted print job data, printer 10 prints output (ST71) and then the print process operations are complete.

Similar to the print process operations shown in FIG. 7, it is possible to apply the operations, instead of step ST64 above, that specify a PC capable of processing the print file and issues the print instruction as described in FIGS. 8 and 9.

FIG. 12 is a pattern diagram illustrating an overview of a print preview function for a print file in the print processing system in FIG. 1. When executing the print process operations shown in FIGS. 7 and 11, the print preview function allows the user to preview the print file on the display of display operation panel 16 of multifunction apparatus 2 before printing.

Figure 12A:
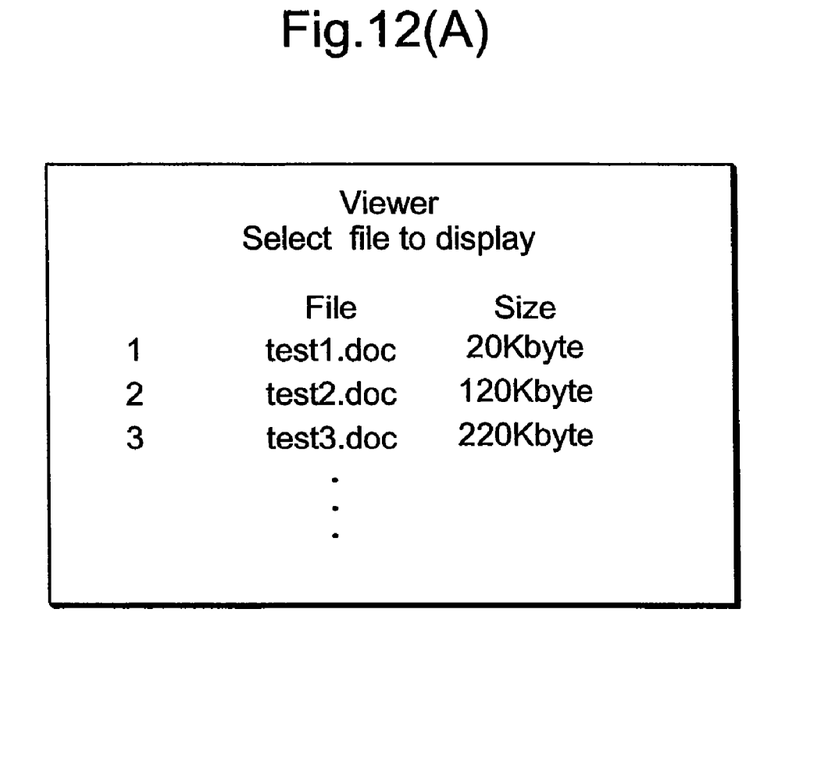
FIG. 12 is a pattern diagram illustrating an overview of a print preview function for a print file in the print processing system in FIG. 1.
Figure 12B:
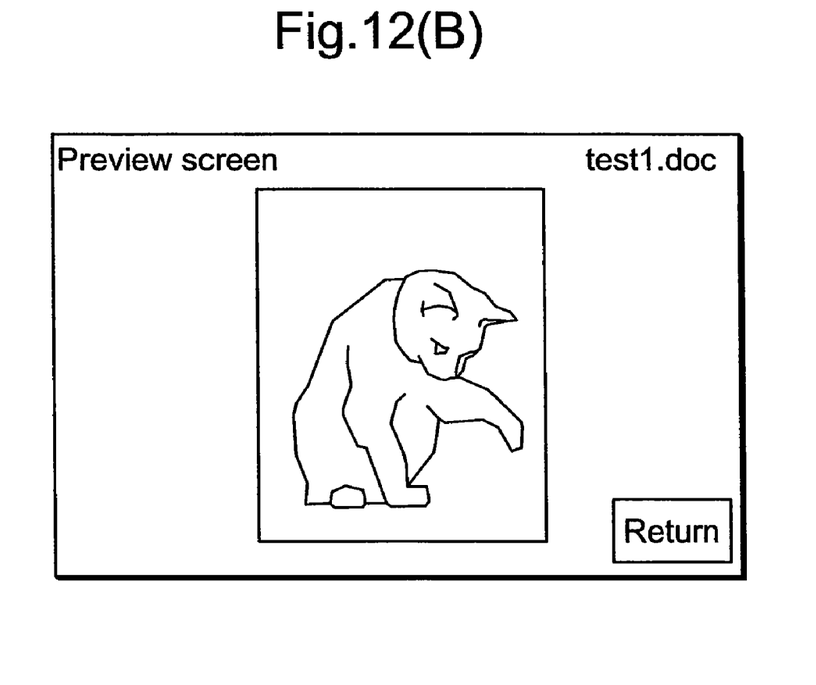

When the print preview function is executed, display operation panel 16 displays on the display a plurality of file names and sizes selected for print preview as shown in FIG. 12 (A). When the user operates predetermined input keys and specifies a file ("test1.doc" in this case), multifunction apparatus 2 develops in work memory 34 print job data received from PC 3; processes the developed print data, such as compressing the data and the like; and generates display data to display a print page on the display of display operation panel 16. Using the display data, display operation panel 16 displays an image of the print page as shown in FIG. 12 (B).

The present invention is described in detail as above based on particular embodiments. The embodiments, however, are provided merely as examples and not construed as limiting of the present invention. The print file in the present invention, for example, is not necessarily a file stored in a memory card or a file attached to an e-mail, but may be a file stored in a storage apparatus such as a hard disk drive in a printing apparatus or a terminal apparatus.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

This application is based on the Japanese Patent Application No. 2005-106196 filed on Apr. 1, 2005, entire content of which is expressly incorporated by reference herein.

What is claimed is:

1. A printing apparatus connected to a plurality of terminal apparatuses, each of the plurality of terminal apparatuses storing file format information, the file format information including a file format that each of the plurality of terminal apparatuses can process and a load status of each of the plurality of terminal apparatuses, the printing apparatus comprising:

a memory configured to store file format information obtained from each of the plurality of terminal apparatuses;

an input device configured to input a plurality of print files;

a controller configured to:
 determine whether the printing apparatus can process a file format of each of the plurality of print files;
 select, when it is determined that the printing apparatus cannot process a file format of a predetermined print file of the plurality of print files, a terminal apparatus for the predetermined print file from the plurality of terminal apparatuses based on the file format information stored in the memory, the selected terminal apparatus being able to process the file format of the predetermined print file;
 instruct the selected terminal apparatus to generate print data from the print file; and
 obtain the generated print data from the selected terminal apparatus; and a printer configured to print the generated print data obtained from the selected terminal apparatus, wherein, when the controller determines that the printing apparatus cannot process the file format of the predetermined print file of the plurality of print files and a predetermined plurality of terminal apparatuses are able to process the file format of the predetermined print file, the controller determines whether a further print file of the plurality of print files, which has been input immediately previous to the predetermined print file, is input by a same user as the user who input the predetermined print file, and selects a same terminal apparatus for processing the predetermined and further print files if it is determined that the predetermined and further print files are input by the same user, and wherein, when the controller determines that the printing apparatus cannot process the file format of the predetermined print file and a predetermined plurality of terminal apparatuses are able to process the file format of the predetermined print file, the controller selects a terminal apparatus from the predetermined plurality of terminal apparatuses as the selected terminal apparatus, based on the load status of each of the predetermined plurality of terminal apparatuses.

2. The printing apparatus according to claim 1, wherein the input device comprising a memory card controller configured to receive a memory card, the memory card storing each print file and the input device inputting each print file from the memory card via the memory card controller.

3. The printing apparatus according to claim 1, wherein the input device comprises an e-mail receiver configured to receive an e-mail to which each print file is attached.

4. The printing apparatus according to claim 1, wherein the file format information further includes an application program that each of the plurality of terminal apparatuses can utilize, and the controller selects a terminal apparatus having a predetermined application program compatible with the file format of the predetermined print file, whereby the selected terminal apparatus generates the print data from the predetermined print file using the predetermined application program.

5. The printing apparatus according to claim 4, wherein the file format information further includes an alternative application program that each of the plurality of terminal apparatuses can utilize, the alternative application program corresponding to the application program, and wherein, when none of the plurality of terminal apparatuses has the predetermined application program, the controller selects a terminal apparatus having a predetermined alternative application program corresponding to the predetermined application program, whereby the selected terminal apparatus generates the print data from the predetermined print file using the predetermined alternative application program.

6. The printing apparatus according to claim 1, further comprises a panel configured to set a priority for each of the plurality of terminal apparatuses, wherein when the predetermined plurality of terminal apparatuses are able to process the file format of the predetermined print file, the controller selects the terminal apparatus from the predetermined plurality of terminal apparatuses, based on the input priority of each of the predetermined plurality of terminal apparatuses.

7. The printing apparatus according to claim 6, wherein, when the selected terminal apparatus fails to generate print data from the predetermined print file, the controller selects, from the predetermined plurality of terminal apparatuses, another terminal apparatus having a next priority, based on the input priority of each of the predetermined plurality of terminal apparatuses.

8. The printing apparatus according to claim 1, wherein the load status is quantified, based on processing capability of each of the plurality of terminal apparatuses and on remaining memory capacity of each of the plurality of terminal apparatuses.

9. The printing apparatus according to claim 1, further comprising a display configured to display the generated print data prior to printing the generated print data.

10. The printing apparatus according to claim 1, further comprising an information obtainer that obtains the file format information from each of the plurality of terminal apparatuses, wherein the information obtainer obtains the load status more frequently than the file format is obtained.

11. The printing apparatus according to claim 1, wherein the controller selects the terminal apparatus from the predetermined plurality of terminal apparatuses, based on the load status of each of the predetermined plurality of terminal apparatuses, if it is determined that the predetermined and further print files are not input by the same user.

12. A print processing system, comprising:
a printing apparatus;
a plurality of terminal apparatuses configured to be connected to the printing apparatus, each of the plurality of terminal apparatuses storing file format information, the file format information including a file format that each of the plurality of terminal apparatuses can process and a load status of each of the plurality of terminal apparatuses;
the printing apparatus further comprising:
a memory configured to store file format information obtained from each of the plurality of terminal apparatuses;
an input device configured to input a plurality of print files;
a controller configured to:
determine whether the printing apparatus can process a file format of each of the plurality of print files;
select, when it is determined that the printing apparatus cannot process a predetermined print file of the plurality of print files, a terminal apparatus for the predetermined print file from the plurality of terminal apparatuses based on the file format information stored in the memory, the selected terminal apparatus being able to process the file format of the predetermined print file;
instruct the selected terminal apparatus to generate print data from the predetermined print file; and
obtain the generated print data from the selected terminal apparatus; and
a printer configured to print the generated print data obtained from the selected terminal apparatus,
wherein, when the controller determines that the printing apparatus cannot process the file format of the predetermined print file of the plurality of print files and a predetermined plurality of terminal apparatuses are able to process the file format of the predetermined print file, the controller determines whether a further print file of the plurality of print files, which has been input immediately previous to the predetermined print file, is input by a same user as the user who input the predetermined print file, and selects a same terminal apparatus for processing the predetermined and further print files if it is determined that the predetermined and further print files are input by the same user, and
wherein, when the controller determines that the printing apparatus cannot process the predetermined print file of the plurality of print files and a predetermined plurality of terminal apparatuses are able to process the file format of the predetermined print file, the controller selects a terminal apparatus from the predetermined plurality of terminal apparatuses as the selected terminal apparatus, based on the load status of each of the predetermined plurality of terminal apparatuses.

13. The print processing system according to claim 12, wherein the printing apparatus further comprises an information obtainer that obtains the file format information from each of the plurality of terminal apparatuses,
wherein the information obtainer obtains the load status more frequently than the file format is obtained.

14. The printing processing system according to claim 12, wherein the controller of the printing apparatus selects the terminal apparatus from the predetermined plurality of terminal apparatuses, based on the load status of each of the predetermined plurality of terminal apparatuses, if it is determined that the predetermined and further print files are not input by the same user.

15. A print processing method for controlling a printer, the printer being connected to a plurality of terminal apparatuses, each of the plurality of terminal apparatuses storing file format information, the file format information including a file format that each of the plurality of terminal apparatuses can process and a load status of each of the plurality of terminal apparatuses, the print processing method comprising:

storing file format information obtained from each of the plurality of terminal apparatuses;

inputting a plurality of print files to the printer;

determining, by the printer, whether the printer can process a file format of each of the plurality of print files;

selecting, by the printer, when it is determined that the printer cannot process a file format of a predetermined print file of the plurality of print files, a terminal apparatus for the predetermined print file of the plurality of print files, from the plurality of terminal apparatuses based on the file format information stored in the memory, the selected terminal apparatus being able to process the file format of the predetermined print file;

instructing, by the printer, the selected terminal apparatus to generate print data from the predetermined print file;

obtaining, by the printer, the generated print data from the selected terminal apparatus; and printing, by the printer, the generated print data obtained from the selected terminal apparatus, wherein, when it is determined that the printer cannot process the file format of the first predetermined print file of the plurality of print files and a predetermined plurality of terminal apparatuses are able to process the file format of the predetermined print file, the method further determining whether a further print file of the plurality of print files, which has been input immediately previous to the predetermined print file, is input by a same user as the user who input the predetermined print file, and wherein the selecting selects a same terminal apparatus for processing the predetermined and further print files if it is determined that the predetermined and further print files are input by the same user, and wherein, when it is determined that the printer cannot process the file format of the predetermined print file of the plurality of print files and a predetermined plurality of terminal apparatuses are able to process the file format of the predetermined print file, the selecting selects a terminal apparatus from the predetermined plurality of terminal apparatuses as the selected terminal apparatus, based on the load status of each of the predetermined plurality of terminal apparatuses.

16. The print processing method according to claim 15, further comprising obtaining the file format information from each of the plurality of terminal apparatuses, wherein the load status is obtained more frequently than the file format.

17. The printing processing method according to claim 15, wherein the terminal apparatus is selected from the predetermined plurality of terminal apparatuses, based on the load status of each of the predetermined plurality of terminal apparatuses, if it is determined that the predetermined and further print files are not input by the same user.

* * * * *